(12) United States Patent
Sextl et al.

(10) Patent No.: US 6,171,568 B1
(45) Date of Patent: Jan. 9, 2001

(54) METHOD FOR THE PURIFICATION OF EXHAUST AIR AND/OR EFFLUENTS BY CONTACT WITH MOULDED BODIES CONTAINING DEALUMINATED ZEOLITE Y

(75) Inventors: Elfriede Sextl, Geiselbach; Eckehart Roland; Peter Kleinschmit, both of Hanau; Akos Kiss, Alzenau-Wasserlos, all of (DE)

(73) Assignee: Degussa-Hüls Aktiengesellschaft, Frankfurt am Main (DE)

( * ) Notice: Under 35 U.S.C. 154(b), the term of this patent shall be extended for 0 days.

(21) Appl. No.: 08/208,143

(22) Filed: Mar. 10, 1994

Related U.S. Application Data

(63) Continuation-in-part of application No. 07/883,877, filed on May 15, 1992, now Pat. No. 5,316,993.

(30) Foreign Application Priority Data

May 27, 1991 (DE) .................................. 41 17 202
Jan. 31, 1992 (DE) .................................. 42 02 671

(51) Int. Cl.$^7$ .................................................. B01D 53/44
(52) U.S. Cl. ................ 423/245.1; 210/690; 55/DIG. 16; 502/60; 502/64; 502/68; 502/79
(58) Field of Search ................ 502/60, 64, 68, 502/79; 423/245.1, 210; 210/690; 55/DIG. 16

(56) References Cited

U.S. PATENT DOCUMENTS

| | | | |
|---|---|---|---|
| 2,090,741 | * | 8/1937 | Zublin .................................. 210/690 |
| 3,140,249 | * | 7/1964 | Plank et al. ............................ 502/60 |
| 3,262,890 | * | 7/1966 | Mitchell et al. ...................... 252/455 |
| 3,676,330 | * | 7/1972 | Plank et al. .......................... 208/111 |
| 3,998,901 | * | 12/1976 | Neuzil et al. ................... 260/674 SA |
| 4,582,815 | * | 4/1986 | Bowes ..................................... 502/64 |
| 4,594,332 | * | 6/1986 | Hoelderich et al. ................... 502/64 |
| 4,724,067 | * | 2/1988 | Raatz et al. ........................... 208/120 |
| 4,855,154 | * | 8/1989 | Gioffre et al. ........................ 426/417 |
| 5,000,794 | * | 3/1991 | Kulprathipanja ....................... 127/55 |
| 5,013,700 | * | 5/1991 | Falth ...................................... 502/79 |
| 5,292,360 | * | 3/1994 | Pacaud et al. ........................... 95/90 |
| 5,310,534 | * | 5/1994 | Fajula et al. .......................... 423/715 |
| 5,312,980 | | 5/1994 | Yonsel et al. ......................... 562/554 |
| 5,316,993 | * | 5/1994 | Sextl et al. ............................. 502/68 |
| 5,342,602 | | 8/1994 | Zimmer et al. ....................... 423/584 |
| 5,348,922 | * | 9/1994 | Kuma ..................................... 502/60 |
| 5,389,357 | * | 2/1995 | Sato et al. ............................. 423/714 |

FOREIGN PATENT DOCUMENTS

0297543 * 1/1989 (EP) .
9009235 * 8/1990 (WO) .
9206758 * 4/1992 (WO) .................................. 210/690

* cited by examiner

*Primary Examiner*—Steven P. Griffin
*Assistant Examiner*—Timothy C Vanoy
(74) *Attorney, Agent, or Firm*—Smith, Gambrell & Russell, LLP

(57) ABSTRACT

Disclosed is a method for the purification of exhaust air and/or effluents, which may be exhausted, for example, from auto painting units or furniture lacquering units, involving contacting the air and/or effluents with a molded body. The molded body is made from dealuminated zeolite Y and at least one binder, which may be, for example, bentonites, kaolins, sepiolites or attapulgites, and having a hydrophobic factor of from 1.5 to 6.0, wherein a slurry of the binder in water does not exceed a pH of 10 and wherein the molded body is calcined at 850° to 1100° C. The molded body is produced by a process involving mixing pulverulent dealuminated zeolite Y with at least one binder, optionally with the addition of a lubricant and/or a pore former, and optionally with water or an organic solvent, moulding the resulting mass to form a molded body, and drying and calcining the molded bodies.

20 Claims, 3 Drawing Sheets

METHOD FOR THE PURIFICATION OF EXHAUST AIR AND/OR EFFLUENTS BY CONTACT WITH MOULDED BODIES CONTAINING DEALUMINATED ZEOLITE Y

REFERENCE TO A RELATED APPLICATION

This is a continuation-in-part of application Ser. No. 07/883,877 filed May 15, 1992, now U.S. Pat. No. 5,316,993, which is relied on and incorporated herein by reference in its entirety.

BACKGROUND AND INTRODUCTION

The present invention relates to a method for the purification of exhaust air and/or effluents involving contacting the air and/or effluents with a moulded body. The moulded body contains dealuminated zeolite Y and at least one binder and having a hydrophobic factor of from 1.5 to 6.0, wherein a slurry of the binder in water does not exceed a pH of 10 and wherein the moulded body is calcined at 850° to 1100° C. The moulded body is produced by a process involving mixing pulverulent dealuminated zeolite Y with at least one binder, optionally with the addition of a lubricant and/or a pore former, and optionally with water or an organic solvent, moulding the resulting mass to form a moulded body, and drying and calcining the moulded bodies at 850° to 1100° C.

Dealuminated zeolite Y in which the $SiO_2/Al_2O_3$ ratio is greater than 20 is known as a pulverulent substance. It is produced by treating zeolite Y in the sodium or hydrogen form with silicon tetrachloride at temperatures from 450 to 600° C. (WO 88/03437—Zeol; Beyer et al., Catalysis by zeolites (1980), pages 203 et seq., Elsevier). It has a pronounced hydrophobic character due to its specific $SiO_2/Al_2O_3$ ratio and may therefore be used for the adsorption of organic compounds, for example solvents, from exhaust air and effluent.

The use of pulverulent dealuminated zeolite Y as adsorbent, for example in fixed bed adsorbers, has the disadvantage that owing to the high packing density an undesirably great pressure drop occurs in the fixed bed and hence a reduction in throughput. Difficulties also arise in a fluidized bed adsorber because the fine powder can only be transferred to the fluidized layer with difficulty. Another disadvantage is the large amount of dust produced when the zeolite powder is introduced into the fixed bed.

SUMMARY OF THE INVENTION

An object of the present invention is to provide a method for the purification of exhaust air and/or effluents involving contacting the air and/or effluents with a moulded body. The moulded body contains dealuminated zeolite Y and at least one binder and having a hydrophobic factor of from 1.5 to 6.0 (preferably from 2.5 to 5), wherein a slurry of the binder in water does not exceed a pH of 10 and wherein the moulded body is calcined at 850° to 1100° C. The moulded body is produced by a process involving mixing pulverulent dealuminated zeolite Y with at least one binder, optionally with the addition of a lubricant and/or a pore former, and optionally with water or an organic solvent, moulding the resulting mass to form a moulded body, and drying and calcining the moulded bodies at 850° to 1100° C.

BRIEF DESCRIPTION OF THE DRAWINGS

The present invention will be further understood with reference to the drawings, wherein.

DETAILED DESCRIPTION OF THE INVENTION

Figure 1:
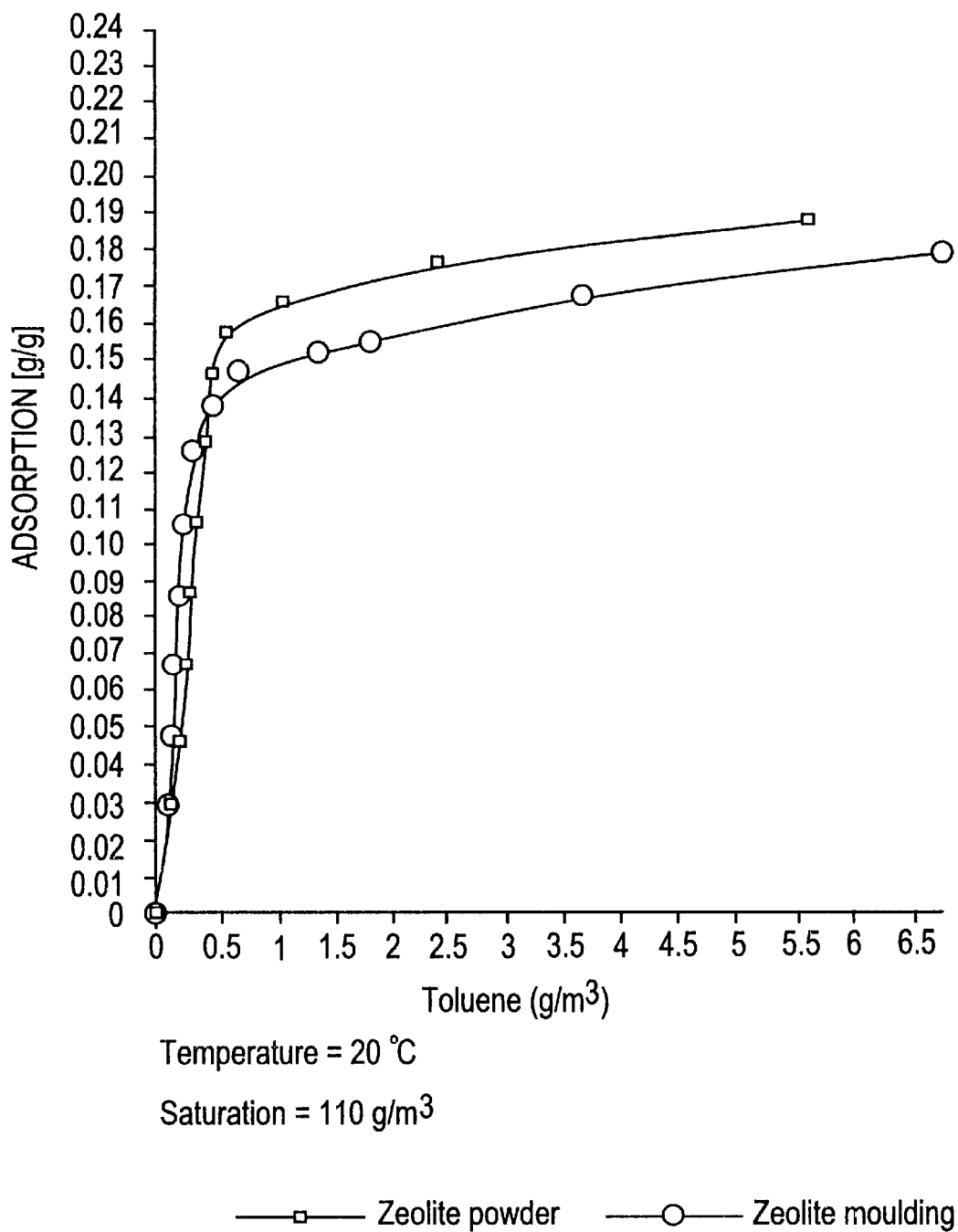
FIG. 1—is a graph showing the adsorption isotherm for the adsorption of gaseous toluene (water content<0.1% by weight) on dealuminated Y-zeolite powders and solid cylinders.

The dealuminated zeolite Y used is preferably one which has an $SiO_2/Al_2O_3$ ratio of from 50 to 1000, preferably from 100 to 300. In particular, the dealuminated zeolite Y may have an average particle size of from 3 $\mu$m to 10 $\mu$m, preferably from 4 $\mu$m to 10 $\mu$m, measured with a laser granulometer.

The zeolite Y used is preferably a pulverulent dealuminated zeolite Y which is produced by the known method of H. K. Beyer and I. Belenykaja, Catalysis by Zeolites, Elsevier, Amsterdam 1980, pages 203 et seq., which is incorporated by reference in its entirety.

The zeolite may be shaped by granulation and by extrusion using a piston extrusion press or a single screw or double screw extruder. The shape of the body may be further influenced by mechanical after-treatments such as rolling in a granulating dish.

The shaping process is composed of several individual steps. The zeolite powder is first mixed with the necessary additives and optionally worked up into a kneadable mass. This mass may be more easily shaped if it is left to rest for several hours or days.

The dry or slightly moist mixture or kneadable mass is moulded together with suitable aggregates to produce particular shapes, e.g. cylinders, hollow cylinders or tubular or cylindrical extrusion moulded products with variously shaped generated surfaces.

As an example of such moulded products, solid cylinders may have a diameter of 1.5 to 7 mm and a length of 2 to 10 mm; hollow cylinders may have an inner diameter of 2 to 5 mm, an exterior diameter of 4 to 10 mm, and a length of 3 to 12 mm.

Drying may be carried out at temperatures from room temperature to 450° C. over a period of from 5 to 20 hours.

The moulded bodies are then calcined at temperatures of from 850 to 1100° C. The calcination is decisive in determining the mechanical properties such as, for example, the breaking strength, which may vary from 10 to 150 N, and the porosity of the moulded bodies. The calcining also influences the hydrophobic character of the dealuminated zeolites and of the matrix formed by the binder, that is to say the hydrophobic character of the whole body is influenced by the calcining.

Dealuminated Y-zeolite is acid resistant but unstable in the presence of alkalies. The binders and other additives used must therefore be substances whose suspension in water does not exceed a pH of 10. When binders which do not satisfy this condition are used, one of the main phenomena observed is that in the course of drying and calcining of the green compacts, the structure of the zeolite breaks down, and this is accompanied by a loss of its characteristic adsorptive properties.

Measurement of the pH is carried out by suspending 5 g of the binder in 100 g of water and determining the pH of the resulting slurry at room temperature (20±2° C.) (DIN 53 200).

The binders used may be clay minerals such as bentonites, kaolins, sepiolites or attapulgites.

The clay minerals are partly alkaline in their reaction with water so that in view of the sensitivity of the dealuminated Y-zeolites to alkalies only selected samples having comparatively low pH-values as aqueous suspensions, i.e. a pH below 10, may be used. The bentonite known as "Westone-L" of ECC International Verkauf GmbH or Sepiolite T 1-400 of Chemie Mineralien KG may advantageously be used.

The clay mineral or mixtures of various clay minerals may be used in quantities of from 5 to 40% by weight, based on the quantity of dried (atro) zeolite mass put into the process.

Silicic acid esters such as tetramethoxysilane or tetraethoxysilane and partially condensed silicic acid esters may also be used as binders. An example of a suitable partially condensed silicic acid ester is Ester 40 (40% $SiO_2$ and 60% ethanol) which is converted by complete hydrolysis into 40% by weight of $SiO_2$ and 60% by weight of ethanol. It consists of oligomers of varying chain lengths. The average overall formula may be represented as follows:

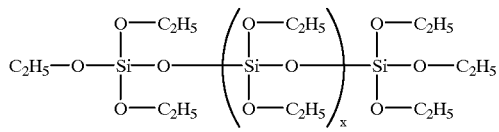

wherein x=3.6.

These substances hydrolyse, leaving pure $SiO_2$ behind as binding phase.

The silicic acid esters or mixtures of various silicic acid esters may be added to the zeolite powder in quantities of from 10 to 70% by weight, based on the quantity of dried (atro) zeolite mass put into the process.

The term "atro" means absolutely dry. This state is obtained by a treatment at 800° for one hour.

Silica sols having a pH of at most 10 may also be used as binders. They give rise to an $SiO_2$ matrix.

The lubricants used may be cellulose ethers, for example methyl hydroxyethyl cellulose, or surfactants in quantities of from 1 to 20% by weight, preferably 2 to 10% by weight, based on the quantity of dried (atro) zeolite mass used.

Polyalcohols such as fructose, pentaerythritol, cellulose or sawdust may be used as pore formers. These are burned out in the calcining process, leaving meso- and macro-pores in the zeolite body. The total volume of these pores is in the range of from 0.35 to 0.90 ml/g of zeolite moulding (atro). The quantities of pore formers used may be from 1 to 30% by weight, preferably from 5 to 15% by weight, based on the quantity of zeolite mass (atro) used.

The moisture and hence plasticity of the mass which is to be shaped is optionally adjusted by the addition of water in a quantity of from 65 to 100% by weight and/or organic solvents, e.g. alcohols (such as methanol or ethanol) in quantities of from 1 to 5% by weight, based on the zeolite mass (atro).

One typical property of many zeolites is their non-newtonic flow when they are stirred up with water or other liquids in certain proportions. This may give rise to serious problems in the shaping process. Dealuminated Y-zeolite shows this behavior if its average particle size determined by the laser granulometer is less than about 4 $\mu$m. These effects occur only to a slight extent in coarse powders.

The moulded bodies according to the invention which have a minimum breaking strength of from 15 to 20 N have the following advantages:

Compared with powders, the moulded bodies according to the invention give rise to comparatively small pressure losses in fixed bed adsorbers but high flow velocities of the gases or liquids to be purified and hence high output rates.

The moulded bodies according to the invention develop only a small amount of dust when filled into fixed beds.

The moulded bodies according to the invention have high breaking strength and abrasion resistance.

The macropore volume is high so that good adsorption and desorption kinetics is possible.

The moulded bodies can be used in the method of the present invention in the adsorption and desorption in the gas phase as well as the liquid phase. Particularly in the gas phase, the moulded bodies are especially useful in exhaust gas purification (e.g., removal of organic solvents) from exhaust streams, for example in the auto painting and furniture lacquering industries).

As will be apparent to those skilled in the art, the moulded bodies can be in any conventional size or shape.

The adsorption is carried out in the usual manner at room temperature, desorption in the liquid phase as well. The desorption temperatures in the gas phase vary between 100°–300° C. Details of adsorption properties of zeolites will be found in Kirk-Othmer, Encyclopedia of Chemical Technology, Third Edition, Volume 15, pages 643–654 which is relied on and incorporated by reference.

A good sorption kinetic is important, especially in adsorption and desorption in the gas phase. A fast adsorption and desorption can only be obtained with good macroporosity of the moulded bodies. The volume of the macropores greater than 30 nm in the moulded bodies should be at least 0.55 ml/g; in order to obtain such macropores, pore formers must be used in the preparation of the zeolite.

In principle, all organic material whose smallest diameter is not larger than about 0.8 nm can be adsorbed more or less fairly well on the moulded bodies. The following groups of materials possess adsorption and desorption properties in the gas phase which would be particularly well suited in the method of the present invention:

(1) Aromatics (e.g., benzene, toluene, xylene).
(2) Esters, ketones, and ethers (e.g., butylacetate, ethylacetate, cyclohexanon, tetrahydrofuran, dioxane, methylethylketone).
(3) Chlorinated hydrocarbons (e.g., methylenechloride, chloroform, carbontetrachloride, dichloroethane, trichloroethane).
(4) Alkanes (e.g., butane, pentane, hexane, heptane).
(5) Alcohols (e.g., ethanol, propanol).

In the liquid phase, the adsorption of the following materials would be particularly well suited in the method of the present invention: Amino acids (e.g., lysine, methionine, leucine, isoleucine, valine, tryptophan).

For purposes of the process of treating exhaust gas or effluents, any suitable conventional equipment can be utilized for the process of the invention. Thus the exhaust gases or the liquid effluent stream, aqueous or otherwise, is passed in contact with the described moulded bodies.

EXAMPLES

The breaking strengths indicated were determined by a breaking strength test system of Erweka Company. This test system measures the minimum force which breaks the moulded bodies when applied to their external surface.

The zeolite used is a zeolite Y which has been dealuminated with $SiCl_4$ and has an $SiO_2/Al_2O_3$ ratio of 200 and an average particle size of from 5 to 8 $\mu$m.

The macropore volumes indicated are determined by the mercury impression method which measures pores having diameters greater than 30 nm (nanometers).

The dealuminated zeolite Y used is a pulverulent zeolite Y which is prepared according to Example 1.

Example 1

300 g of calcined NaY zeolite (SiO$_2$/Al$_2$O$_3$=5.1, loss on annealing at 1000° C.: 1.5% by weight) are heated to 450° C. (measured in the gas phase above the zeolite) within 1.5 hours in a horizontally placed glass tube (internal diameter: 10 cm, length of reaction zone: 80 cm) under nitrogen (10 l/h).

After a further 15 minutes, 360 g of SiCl$_4$ (which has been converted into the gaseous state in an evaporator (100° C.)) are passed over the zeolite at this temperature (450° C.) for one hour. The zeolite is then left to cool in a stream of inert gas for 2 hours. The product is suspended in 5 liters of water and stirred for 30 minutes.

The zeolite is filtered and then made up into a slurry in 5 liters of 1 M hydrochloric acid. This suspension is then heated to 90° C. for one hour. After it has cooled to room temperature, it is filtered through a Buechner funnel. The zeolite filter cake is washed with water until no chloride ions can be detected in the wash water by means of AgNO$_3$ solution. The zeolite is then dried in a drying cupboard at 120° C. for 15 hours. This zeolite is found analytically to have an SiO$_2$/Al$_2$O$_3$ ratio of 200.

Hydrophobic factor:

The hydrophobic factor (HF) describes the degree of hydrophobic character of the dealuminated zeolite Y.

It is defined by the following quotient:

$$HF = \frac{\text{p-Xylene uptake at 1 g/m}^3 \text{ p Xylene concentration (20° C.) g/100 g}}{\text{Water uptake at 50 \% relative humidity (adsorptive) g/100 g.}}$$

Example 2

The bentonite known as "Westone-L" marketed by ECC International Verkauf GmbH is a suitable clay mineral for the shaping of dealuminated Y-zeolite. The pH of an aqueous slurry of this bentonite is 8.3.

To produce extrusion mouldings, 114.7 g of pulverulent dealuminated Y-zeolite (prepared according to Example 1) and 28.6 g of Westone-L are mixed dry in a kneader for 10 minutes. 4.0 g of methyl hydroxyethyl cellulose and 15.0 g of pentaerythritol are added. 114 ml of water are then added gradually while kneading is carried out. The plastic kneaded mass obtained is processed in an extruder to produce extrusion mouldings having a diameter of 3 mm and a length of about 15 mm. These mouldings are predried in a drying cupboard at 120° C. for several hours and then calcined at 950° C. in a box furnace. The heating rate is 100 K/h. The final temperature is maintained for 1 hour.

The breaking strength of the mouldings obtained is 28 N. The equilibrium charge of p-xylene is 14.9% by weight at 20° C. and at a p-xylene gas phase concentration of 4.1 g/m$^3$. The equilibrium charge of water is 2.9% by weight at 20° C. and at a relative humidity of the gas space which is in equilibrium with the zeolite of 68%.

Example 3

The clay mineral sepiolite known as "Sepiolite T1-400" supplied by Chemie Mineralism KG is used as clay mineral for this example. Its Al$_2$O$_3$ content is only 1.7% by weight so that the risk of back exchange of aluminum in the dealuminated Y-zeolite is slight. The pH of an aqueous slurry of this sepiolite is 8.5.

An extrudable kneading mass is prepared by adding together 515 g of pulverulent dealuminated zeolite Y (DAY) (prepared according to Example 1), 71.8 g of sepiolite, 20 g of methyl hydroxyethyl cellulose, 75.0 g of pentaerythritol as pore former and 475 g of water. The mixture is kneaded for 2 hours and then extruded. The mouldings are predried at 120° C. for several hours and then calcined at 950° C. The heating rate is 100 K/h and the temperature is maintained for one hour.

The extruded mouldings obtained (cylinders having diameters of 4 mm and lengths of about 6 mm) have a breaking strength of 28 N. The macropore volume is 0.55 ml/g. Adsorption isotherms are drawn up for various solvents.

The following Tables show the measured pairs of values, for example for toluene and water. The hydrophobic factor is found to be 4.2.

TABLE 3

| Pairs of values of the toluene adsorption isotherms at 20° C. | |
|---|---|
| Toluene concentration (g/m$^3$) | Equilibrium charge (g toluene/100 g DAY) |
| 11.45 | 15.9 |
| 1.08 | 13.5 |
| 0.57 | 12.6 |
| 0.42 | 12.1 |
| 0.30 | 11.6 |
| 0.15 | 6.0 |

TABLE 4a

| Pairs of values of the water adsorption isotherms at 20° C. (determined desorptively)* | |
|---|---|
| Water concentration (g/m$^3$) | Equilibrium charge (g water/100 g DAY) |
| 13.6 | 74 |
| 10.1 | 50 |
| 6.2 | 3.8 |
| 1.8 | 1.6 |

*"determined desorptively" means that the water concentration in the air stream was continuously reduced from one measuring point to the next.

TABLE 4b

| Pairs of values of the water adsorption isotherms at 20° C. (determined adsorptively)** | |
|---|---|
| Water concentration (g/m$^3$) | Equilibrium charge (g water/100 g DAY) |
| 1.8 | 1.6 |
| 6.9 | 2.9 |
| 10.0 | 4.5 |
| 13.6 | 7.4 |

**"determined adsorptively" means that the water concentration in the air stream was continuously increased from one measuring point to the next.

Example 4

33.3 g of Zeolite powder (dealuminated Y-zeolite according to Example 1), 4.5 kg of pentaerythritol as pore former and 1.2 kg of methyl hydroxyethyl cellulose as lubricant are mixed together in a 200 liter kneader. The mass is kneaded for 2 hours after the addition of 16.8 kg of water. 8.9 kg of tetramethyoxysilane as binder, 0.6 kg of methanol and 7.6 kg of water are then added and the mixture is kneaded for a further 2 hours. The plastic kneading mass thus obtained is extruded, using a kneader with discharge screw. Suitable nozzles are used to produce solid cylinders having diameters of 3 mm and 4 mm and hollow cylinders having external diameters of 5 mm. The lengths of these mouldings are from 5 to 7 mm.

The mouldings obtained are dried for several hours at 120° C. and then calcined at 950° C. This temperature is maintained for one hour. The heating rate is 100 K/h.

The breaking strength of the solid cylinders having diameters of 3 mm and 4 mm, respectively, is 37 N and 30 N, respectively, and that of the hollow cylinders is 15 N. The macropore volume of the solid cylinders is 0.7 ml/g.

The adsorption isotherms for various solvents are drawn up for the 4 mm solid cylinders used as example. The pairs of values measured for toluene and water are given by way of example in the following Table. The hydrophobic factor is found to be 4.9.

TABLE 5

Pairs of values of the toluene adsorption isotherms at 20° C.

| Toluene concentration (g/m$^3$) | Equilibrium charge (g toluene/100 g DAY) |
|---|---|
| 12.2 | 17.9 |
| 1.2 | 15.1 |
| 0.46 | 13.9 |
| 0.128 | 2.7 |

TABLE 6a

Pairs of values of the water adsorption isotherms at 20° C. (determined desorptively*)

| Water concentration (g/m$^3$) | Equilibrium charge (g toluene/100 g DAY) |
|---|---|
| 14.0 | 6.8 |
| 10.1 | 4.9 |
| 6.7 | 3.9 |
| 1.76 | 1.4 |

TABLE 6b

Pairs of values of the water adsorption isotherms at 20° C. (determined adsorptively**)

| Water concentration (g/m$^3$) | Equilibrium charge (g toluene/100 g DAY) |
|---|---|
| 1.76 | 1.4 |
| 6.58 | 2.8 |
| 10.04 | 4.2 |
| 13.98 | 6.7 |

Mixed isotherms of dealuminated Y-zeolite show the hydrophobic properties of this adsorbent particularly clearly.

The pairs of values for the mixed adsorption isotherms of toluene/water are shown below. These isotherms are drawn up by exposing the mouldings simultaneously to water (at a constant gas phase concentration of 12.4 g/m$^3$) and toluene (variable gas phase concentrations).

TABLE 7

Pairs of values of the mixed adsorption isotherms for toluene/water at 20° C.

| Water concentration (g/m$^3$) | Equilibrium charge (g water/100 g DAY) | | |
|---|---|---|---|
| | Total | Toluene | H$_2$O |
| 11.5 | 19.1 | 17.1 | 2.0 |
| 1.25 | 17.8 | 14.5 | 3.3 |
| 0.135 | 7.6 | 3.6 | 4.0 |

Example 5

1.03 kg of dealuminated Y-zeolite (prepared according to Example 1), 408 g of tetraethoxysilane, 40 g of methyl hydroxyethyl cellulose, 150 g of pentaerythritol and 700 g of water are added together and kneaded for 2 hours. The resulting mass is extruded to form solid cylinders having diameters of 4 mm and lengths of about 6 mm. The mouldings are then dried in air for 2 days and thereafter in a drying cupboard at 120° C. for several hours. Calcining is carried out at 950° C. (heating rate: 100 K/h; holding time: 1 h).

The breaking strength of the solid cylinders obtained is 55 N.

The equilibrium charge of p-xylene is 17.3% by weight at 20° C. and a p-xylene equilibrium gas phase concentration of 4.1 g/m$^3$.

The equilibrium charge of water is 3.6% by weight at 20° C. and at a relative humidity of the gas space in equilibrium with the zeolite of 68%.

Example 6

32.4 kg of dealuminated Y-zeolite (prepared according to Example 1), 87.6 kg of "Ester 40" (partially condensed tetraethoxysilane), 2.38 kg of methyl hydroxyethyl cellulose, 4.47 kg of pentaerythritol and 25.0 liters of water are gradually added together and the mixture is kneaded for a total of 5 hours.

The kneading mass obtained is extruded to form solid cylinders 4 mm in diameter and about 7 mm in length, using a kneader with discharge screw. After the mouldings have been predried at 120° C. they are calcined in a muffle furnace at 950° C. (heating rate: 100 K/h; holding time: 1 h). The breaking strength of the solid cylinders is 64N. The macropores take up a volume of 0.63 ml/g.

Adsorption isotherms are drawn up for various solvents. The measured pairs of values are shown in the following Tables for toluene and water by way of example. The hydrophobic factor is found to be 2.5.

TABLE 8

Pairs of values of toluene adsorption isotherms at 20° C.

| Toluene concentration (g/m$^3$) | Equilibrium charge (g toluene/100 g DAY) |
|---|---|
| 12.0 | 18.1 |
| 2.1 | 16.0 |
| 0.97 | 14.9 |
| 0.57 | 13.8 |
| 0.19 | 8.8 |
| 0.10 | 3.2 |

TABLE 9a

Pairs of values of the water adsorption isotherms at
20° C. (determined desorptively*)

| Water concentration (g/m³) | Equilibrium charge (g water/100 g DAY) |
|---|---|
| 13.7 | 12.4 |
| 10.0 | 7.1 |
| 6.23 | 5.2 |
| 1.76 | 2.0 |

TABLE 9b

Pairs of values of the water adsorption isotherms at
20° C. (determined desorptively**)

| Water concentration (g/m³) | Equilibrium charge (g water/100 g DAY) |
|---|---|
| 1.76 | 2.0 |
| 6.92 | 4.2 |
| 10.0 | 5.8 |
| 13.7 | 12.4 |

Example 7

102 g of dealuminated Y-zeolite (prepared according to Example 1) is introduced into the kneader and 59 g of silica sol ("LUDOX LS" of Du Pont; $SiO_2$ content: 30% by weight) are gradually added. 6.2 g of methyl hydroxyethyl cellulose (preswelled in 75 g of water) are added after a kneading time of 10 minutes. Further kneading results in a plastic mass which is moulded by means of an extruder to produce solid cylinders 3 mm in diameter and about 15 mm in length.

The products are then dried at 120° C. for several hours and thereafter calcined at 850° C. (heating rate: 100 K/h). The breaking strength of the mouldings obtained is 14 N.

Example 8

102 g of dealuminated Y-zeolite, 45 g of tetramethyoxysilane, 6.2 g of methyl hydroxyethyl cellulose (preswelled), 10.0 g of fructose ground in a ball mill and 77 g of water are worked up into a plastic mass in a kneader. The solid cylinders produced in an extruder, which are dried at 120° C. and calcinated at 850° C., have breaking strengths of 46 N.

Example 9

Production effluent from a lacquering plant, containing various solvents (main components: ethanol, ethyl acetate, tert. butanol, methyl acetate, isopropanol and ethyl glycol) at a total concentration of 880 mg/l, is added in a quantity of 100 ml to 1 g of pulverulent dealuminated Y-zeolite. The zeolite has adsorbed barely half of the noxious substances after 2 hours (T=20° C.) (total solvent concentration: 410 mg/l).

Example 10

Extruded mouldings produced using tetramethoxysilane as binder according to Example 4 are calcined at 850, 900, 950 and 1000° C. The heating rate is 100 K/h and the final temperature is maintained for one hour. The properties of the mouldings obtained are summarized in the following Table.

The adsorption data given in the Table are determined at a temperature of 20° C. A gas flow concentration of 4.1 g/m³ is used for determining the p-xylene adsorption capacity. The values for the water adsorption are obtained at a relative humidity of the air stream of 68%.

| Calcining temperature (° C.) | Equilibrium charge (g water/100 gDAY) | |
|---|---|---|
| | p-xylene | $H_2O$ |
| 850 | 14.6 | 8.2 |
| 900 | 12.8 | 4.8 |
| 950 | 12.0 | 2.4 |
| 1000 | 11.9 | 2.2 |

The data show that the p-xylene charge slightly decreases with increasing calcining temperature. The water adsorption capacity is very greatly influenced. An increase in the calcining temperature from 850° to 1000° C. results in a decrease in the water charge to barely one quarter of the original value. This low water adsorption is of decisive importance for the intended use of the zeolite mouldings for the selective adsorption of organic components from effluents or moist exhaust air. Dealuminated Y-zeolite calcined at high temperatures is therefore described as a hydrophobic adsorbent.

Example 11

Figure 2:
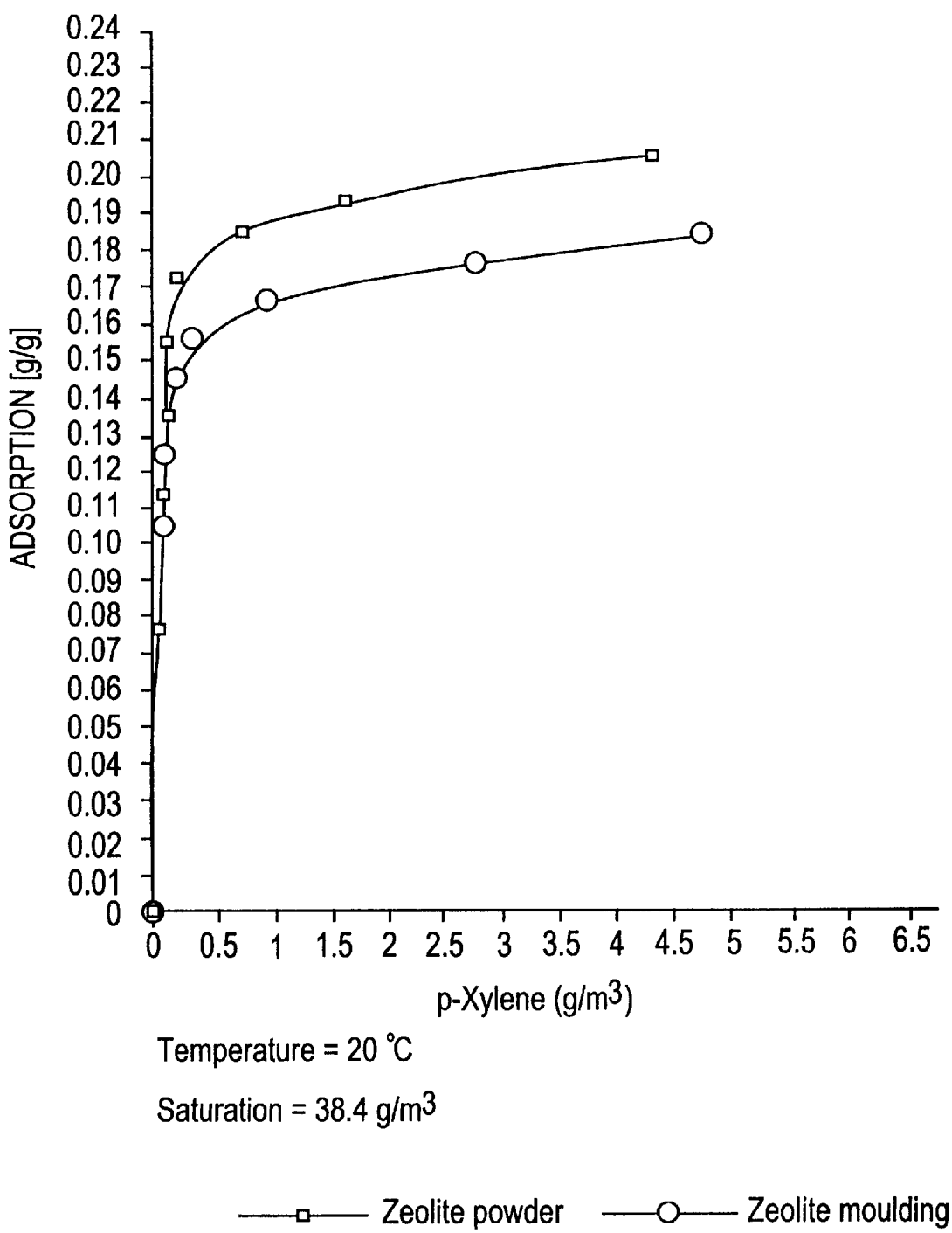
FIG. 2—is a graph showing the adsorption isotherm for the adsorption of gaseous p-xylene (water content<0.1% by weight) on dealuminated Y-zeolite powders and solid cylinders.
Figure 3:
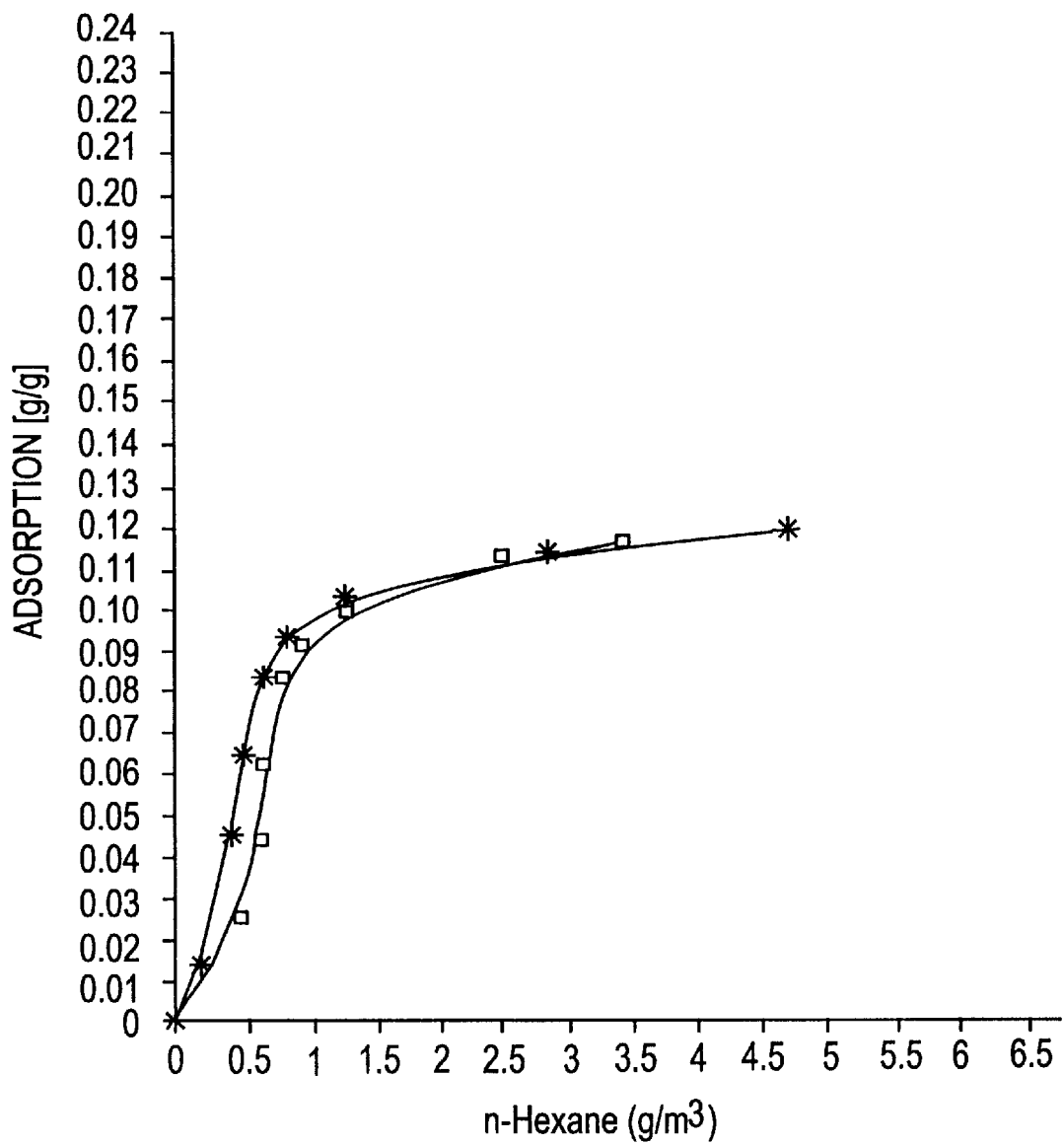
FIG. 3—is a graph showing the adsorption isotherm for the adsorption of gaseous n-hexane (water content<0.1% by weight) on dealuminated Y-zeolite powders and solid cylinders.

Adsorption isotherms for the adsorption of gaseous toluene, p-xylene and n-hexane (water content in each case<0.1% by weight) on dealuminated Y-zeolite are shown in FIGS. 1, 2 and 3 respectively. The graphs are given for powders and solid cylinders (prepared according to Example 4; $\phi$=4 mm, 1=6 mm; binding matrix 10% by weight $SiO_2$).

At high equilibrium gas phase concentrations of toluene and p-xylene, the equilibrium charge of the mouldings is in each case about 90% of that of the powder. The difference of about 10% corresponds to the binder content. It follows that the adsorption capacity of the powder is not reduced by the moulding process.

The moulding process may in fact have a positive effect on the adsorption of dealuminated Y-zeolite. The isotherms for n-hexane show that a change from powder to moulding may have a positive effect on the isotherms.

Example 12

Dealuminated Y-zeolite (pulverulent) as hydrophobic adsorbent for the adsorption of gaseous organic substances.

Adsorption isotherms for gaseous toluene and for gaseous water are determined on the dealuminated Y-zeolite (pulverulent) prepared according to Example 1.

For this purpose, a stream of air containing toluene or water is passed over the powder until the equilibrium charge of toluene or water has been established on the zeolites, and this equilibrium charge is then determined by weighing.

The equilibrium charges and the corresponding gas phase equilibrium concentrations of toluene and water are summarized in the following Tables.

TABLE 1

Pairs of values of the toluene adsorption isotherms at 20° C.

| Toluene concentration (g/m³) | Equilibrium charge (g water/100 g DAY) |
| --- | --- |
| 12.16 | 19.2 |
| 1.16 | 16.3 |
| 0.65 | 15.2 |
| 0.31 | 13.5 |
| 0.21 | 9.3 |
| 0.12 | 3.1 |

TABLE 2a

Pairs of values of the water adsorption isotherms at 20° C. (determined desorptively*)

| Water concentration (g/m³) | Equilibrium charge (g water/100 g DAY) |
| --- | --- |
| 13.6 | 7.2 |
| 10.2 | 5.0 |
| 6.8 | 3.8 |
| 1.76 | 0.9 |

TABLE 2b

Pairs of values of the water adsorption isotherms at 20° C. (determined adsorptively**)

| Water concentration (g/m³) | Equilibrium charge (g water/100 g DAY) |
| --- | --- |
| 1.76 | 0.9 |
| 6.9 | 2.5 |
| 10.3 | 4.1 |
| 13.6 | 7.2 |

These adsorption isotherms show that water is hardly adsorbed on dealuminated Y-zeolite but organic substances are very efficiently adsorbed on dealuminated Y-zeolite, which may therefore be described as a hydrophobic adsorbent.

Example 13

20 g of zeolite extrudates containing 90% by weight Y-zeolite and 10% by weight $SiO_2$ as binder were added to 200 ml of 70% by weight strength aqueous $H_2O_2$ solution with a total carbon content (TC) of 390 mg/l. The sample was gently shaken for 2 hours. Then the zeolite extrudates were separated from the solution and the carbon content of the treated $H_2O_2$ solution was determined. It was found that the carbon content (TC) had decreased to 110 mg/l. The carbon load on the zeolite extrudated was determined to be 2.5 mg TC/g zeolite.

Further variations and modifications of the invention will become apparent to those skilled in the art from the foregoing and are intended to be encompassed by the claims appended hereto.

German Priority Applications P 41 17 202.7 and P 42 02 671.7, filed May 27, 1991 and Jan. 31, 1992 respectively, are relied on and incorporated by reference.

U.S. patent application Ser. No. 08/159,578, filed on Dec. 1, 1993, and U.S. patent application Ser. No. 08/055,313, filed on May 3, 1993, are incorporated by reference in their entirety.

What is claimed:

1. A method for the removal of organic material from exhaust air and/or effluents, said method comprising contacting said air and/or said effluents in a fixed bed with a moulded body as fixed bed adsorber, wherein said moulded body has a breaking strength of 10 to 150 N; wherein said moulded body comprises dealuminated zeolite Y and at least one binder and having a hydrophobic factor of from 1.5 to 6.0, wherein a slurry of said binder in water does not exceed a pH of 10; and wherein said moulded body is produced by a process comprising mixing pulverulent dealuminated zeolite Y with at least one binder, optionally with the addition of a lubricant and/or a pore former, and optionally with water or an organic solvent, moulding by granulation or extrusion of the resulting kneadable mass to form a moulded body, and drying and calcining at 850° to 1100° C. said moulded body.

2. The method according to claim 1, wherein said hydrophobic factor ranges from 2.5–5.

3. The method according to claim 1, wherein said pulverulent dealuminated zeolite Y has an $SiO_2/Al_2O_3$ ratio of 50 to 1000.

4. The method according to claim 3, wherein said pulverulent dealuminated zeolite Y has an $SiO_2/Al_2O_3$ ratio of 100 to 300.

5. The method according to claim 1, wherein said binder is a clay mineral and the amount of binder present in the mixture of zeolite Y and binder is from 5 to 40 percent.

6. The method according to claim 5, wherein said clay mineral is selected from the group consisting of bentonites, kaolins, sepiolites, and attapulgites.

7. The method according to claim 1, wherein said pulverulent dealuminated zeolite Y has an average particle size of 3 to 10 $\mu$m.

8. The method according to claim 7, wherein said pulverulent dealuminated zeolite Y has an average particle size of 4 to 10 $\mu$m.

9. The method according to claim 8, wherein said pulverulent dealuminated zeolite Y has an average particle size of 5 to 8 $\mu$m.

10. The method according to claim 1, wherein said moulded body has mesopores and macropores of a total volume in the range of 0.35 to 0.9 ml/g based on the dry weight of zeolite.

11. The method according to claim 1, wherein said moulded body has a minimum breaking strength from 15 to 20 N.

12. The method according to claim 1, wherein said organic material is organic solvents in said effluents.

13. The method according to claim 12, wherein said organic solvents are in an effluent from auto painting.

14. The method according to claim 12, wherein said organic solvents are in an effluent from furniture lacquering.

15. The method according to claim 1, wherein said process of treating the exhaust gas or effluent is carried out at room temperature.

16. The method according to claim 1, wherein said organic solvents are desorbed from the moulded body in the gas phase at a desorption temperature of 100° to 300° C.

17. The method according to claim 1, wherein the volume of the macropores which are greater than 30 nm present in said moulded body, is at least 0.55 ml/g.

18. The method according to claim 1, wherein said organic material is at least one member selected from the group consisting of aromatics, esters, ketones, ethers, chlorinated hydrocarbons, alkanes, and alcohols in gaseous effluents.

19. The method according to claim 1, wherein said organic material is amino acids in a liquid effluent.

20. The method according to claim 1, wherein said binder is selected from the group consisting of silica sol, tetramethoxysilane and tetraethoxysilane.

* * * * *